(12) United States Patent
Barker et al.

(10) Patent No.: US 7,087,346 B2
(45) Date of Patent: Aug. 8, 2006

(54) ALKALI/TRANSITION METAL PHOSPHATES AND RELATED ELECTRODE ACTIVE MATERIALS

(75) Inventors: Jeremy Barker, Oxfordshire (GB); M. Yazid Saidi, Henderson, NV (US); Jeffrey Swoyer, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 67 days.

(21) Appl. No.: 10/945,304

(22) Filed: Sep. 20, 2004

(65) Prior Publication Data

US 2005/0058905 A1 Mar. 17, 2005

Related U.S. Application Data

(62) Division of application No. 10/092,317, filed on Mar. 6, 2002, now Pat. No. 6,815,122.

(51) Int. Cl.
*H01M 4/00* (2006.01)
*H01M 4/58* (2006.01)

(52) U.S. Cl. ................ 429/128; 429/218.1; 429/231.9; 429/231.6

(58) Field of Classification Search ................ 429/128, 429/218.1, 231.9, 231.6
See application file for complete search history.

(56) References Cited

U.S. PATENT DOCUMENTS 5,571,637 A * 11/1996 Idota .......................... 429/338

FOREIGN PATENT DOCUMENTS

EP 1094533 A1 * 4/2001

* cited by examiner

*Primary Examiner*—Dah-Wei Yuan
*Assistant Examiner*—Helen Chu
(74) *Attorney, Agent, or Firm*—Michael D. Ross; Roger A. Williams; Cynthia S. Kovacevic

(57) ABSTRACT

Electrode active materials comprising lithium or other alkali metals, a transition metal, and a phosphate or similar moiety, of the formula:

$$A_{a+x}M_bP_{1-x}Si_xO_4$$

wherein
(a) A is selected from the group consisting of Li, Na, K, and mixtures thereof, and $0<a<1.0$ and $0\leq x\leq 1$;
(b) M comprises one or more metals, comprising at least one metal which is capable of undergoing oxidation to a higher valence state, where $0<b\leq 2$; and wherein M, a, b, and x are selected so as to maintain electroneutrality of said compound.

27 Claims, No Drawings

ALKALI/TRANSITION METAL PHOSPHATES AND RELATED ELECTRODE ACTIVE MATERIALS

This Application is a divisional of application Ser. No. 10/092,317, filed Mar. 6, 2002, now pending.

FIELD OF THE INVENTION

This invention relates to electrode active materials, electrodes, and batteries. In particular, this invention relates to active materials comprising lithium or other alkali metals, transition metals, and phosphates or similar moieties.

BACKGROUND OF THE INVENTION

A wide variety of electrochemical cells, or "batteries," are known in the art. In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transmission lines).

Batteries can be generally described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is essentially irreversible, so that the battery becomes unusable once discharged; and "secondary," where the electrochemical reaction is, at least in part, reversible so that the battery can be "recharged" and used more than once. Secondary batteries are increasingly used in many applications, because of their convenience (particularly in applications where replacing batteries can be difficult), reduced cost (by reducing the need for replacement), and environmental benefits (by reducing the waste from battery disposal).

There are a variety of secondary battery systems known in the art. Among the most common systems are lead-acid, nickel-cadmium, nickel-zinc, nickel-iron, silver oxide, nickel metal hydride, rechargeable zinc-manganese dioxide, zinc-bromide, metal-air, and lithium batteries. Systems containing lithium and sodium afford many potential benefits, because these metals are light in weight, while possessing high standard potentials. For a variety of reasons, lithium batteries are, in particular, commercially attractive because of their high energy density, higher cell voltages, and long shelf-life.

Lithium batteries are prepared from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically nonaqueous aprotic organic solvents. Other electrolytes are solid electrolytes (typically polymeric matrices) that contain an ionic conductive medium (typically a lithium containing salt dissolved in organic solvents) in combination with a polymer that itself may be ionically conductive but electrically insulating.

Cells having a metallic lithium anode and metal chalcogenide cathode are charged in an initial condition. During discharge, lithium metal yields electrons to an external electrical circuit at the anode. Positively charged ions are created that pass through the electrolyte to the electrochemically active (electroactive) material of the cathode. The electrons from the anode pass through the external circuit, powering the device, and return to the cathode.

Another lithium battery uses an "insertion anode" rather than lithium metal, and is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions (Li+) between the anode and cathode during charge and discharge cycles had led to these cells as being called "rocking chair" batteries.

A variety of materials have been suggested for use as cathode active materials in lithium batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$, $CuCl_2$. Transition metal oxides, such as those of the general formula $Li_xM_2O_y$, are among those materials preferred in such batteries having intercalation electrodes. Other materials include lithium transition metal phosphates, such as $LiFePO_4$, and $Li_3V_2(PO_4)_3$. Such materials having structures similar to olivine or NASICON materials are among those known in the art. Cathode active materials among those known in the art are disclosed in S. Hossain, "Rechargeable Lithium Batteries (Ambient Temperature)," *Handbook of Batteries*, 2d ed., Chapter 36, Mc-Graw Hill (1995); U.S. Pat. No. 4,194,062, Carides, et al., issued Mar. 18, 1980; U.S. Pat. No. 4,464, 447, Lazzari, et al., issued Aug. 7, 1984; U.S. Pat. No. 5,028,500, Fong et al., issued Jul. 2, 1991; U.S. Pat. No. 5,130,211, Wilkinson, et al., issued Jul. 14, 1992; U.S. Pat. No. 5,418,090, Koksbang et al., issued May 23, 1995; U.S. Pat. No. 5,514,490, Chen et al., issued May 7, 1996; U.S. Pat. No. 5,538,814, Kamauchi et al., issued Jul. 23, 1996; U.S. Pat. No. 5,695,893, Arai, et al., issued Dec. 9, 1997; U.S. Pat. No. 5,804,335, Kamauchi, et al., issued Sep. 8, 1998; U.S. Pat. No. 5,871,866, Barker et al., issued Feb. 16, 1999; U.S. Pat. No. 5,910,382, Goodenough, et al., issued Jun. 8, 1999; PCT Publication WO/00/31812, Barker, et al., published Jun. 2, 2000; PCT Publication WO/00/57505, Barker, published Sep. 28, 2000; U.S. Pat. No. 6,136,472, Barker et al., issued Oct. 24, 2000; U.S. Pat. No. 6,153,333, Barker, issued Nov. 28, 2000; PCT Publication WO/01/13443, Barker, published Feb. 22, 2001; PCT Publication WO/01/54212, Barker et al., published Jul. 26, 2001; PCT Publication WO/01/84655, Barker et al., published Nov. 8, 2001.

In general, such a cathode material must exhibit a high free energy of reaction with lithium, be able to intercalate a large quantity of lithium, maintain its lattice structure upon insertion and extraction of lithium, allow rapid diffusion of lithium, afford good electrical conductivity, not be significantly soluble in the electrolyte system of the battery, and be readily and economically produced. However, many of the cathode materials known in the art lack one or more of these characteristics. As a result, for example, many such materials are not economical to produce, afford insufficient voltage, have insufficient charge capacity, or lose their ability to be recharged over multiple cycles.

SUMMARY OF THE INVENTION

The invention provides electrode active materials comprising lithium or other alkali metals, a transition metal, and a phosphate or similar moiety. Such electrode actives include those of the formula:

$$A_{a+x}M_b P_{1-x}Si_x O_4$$

wherein
(a) A is selected from the group consisting of Li, Na, K, and mixtures thereof, and $0<a<1.0$; and
(b) M comprises one or more metals, comprising at least one metal which is capable of oxidation to a higher valence state; and
wherein $0<b<2$, $0 \leq x \leq 1$, and M, a, b, and x are selected so as to maintain electroneutrality of said compound.

In a preferred embodiment, M comprises at least one transition metal selected from Groups 4 to 11 of the Periodic Table. In another preferred embodiment, M comprises $M'_c M''_d$, where M' is at least one transition metal from Groups 4 to 11 of the Periodic Table; and M" is at least one element from Groups 2, 3, 12, 13, or 14 of the Periodic Table, and $c+d=b$. Preferred embodiments include those where $0.2 \leq a < 1.0$ and those where $0.1 \leq a \leq 0.8$. Preferred embodiments include those where $1.0 \leq b \leq 1.5$. Preferred embodiments include those having a structure similar to the mineral olivine (herein "olivines").

This invention also provides electrodes comprising an electrode active material of this invention. Also provided are batteries that comprise a first electrode having an electrode active material of this invention; a second electrode having a compatible active material; and an electrolyte. In a preferred embodiment, the novel electrode material of this invention is used as a positive electrode (cathode) active material, reversibly cycling lithium ions with a compatible negative electrode (anode) active material.

It has been found that the novel electrode materials, electrodes, and batteries of this invention afford benefits over such materials and devices among those known in the art. Such benefits include increased capacity, enhanced cycling capability, enhanced reversibility, and reduced costs. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

DESCRIPTION OF THE INVENTION

The present invention provides electrode active materials for use in a battery. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells.

The electrode active materials of this invention may be used in the anode, the cathode, or both. Preferably, the active materials of this invention are used in the cathode. (As used herein, the terms "cathode" and "anode" refer to the electrodes at which oxidation and reduction occur, respectively, during battery discharge. During charging of the battery, the sites of oxidation and reduction are reversed. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.)

Electrode Active Materials:

The present invention provides active materials (herein "electrode active materials") comprising lithium or other alkali metals, a transition metal, and a phosphate or similar moiety. Such electrode active materials include those of the formula $A_{a+x}M_b P_{1-x}Si_x O_4$. (As used herein, the word "include," and its variants, is intended to be non-limiting, such that recitation of items in a list is not to the exclusion of other like items that may also be useful in the materials, compositions, devices, and methods of this invention.)

A is selected from the group consisting of Li (lithium), Na (sodium), K (potassium), and mixtures thereof. In a preferred embodiment, A is Li, or a mixture of Li with Na, a mixture of Li with K, or a mixture of Li, Na and K. In another preferred embodiment, A is Na, or a mixture of Na with K. Preferably "a" is from about 0.1 to about 0.95, more preferably from about 0.2 to about 0.9, and more preferably from about 0.4 to about 0.8.

M comprises one or more metals, comprising at least one metal which is capable of undergoing oxidation to a higher valence state. In a preferred embodiment, removal of alkali metal from the electrode active material is accompanied by a change in oxidation state of at least one of the metals comprising M. The amount of said metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A_a M_b XO_4$ (where $XO_4$ is $P_{1-x}Si_x O_4$), the amount (a') of alkali metal that can be removed, as a function of the quantity of M (b') and valency ($V^M$) of oxidizable metal, is $$a' = b'(\Delta V^M),$$

where $\Delta V^M$ is the difference between the valence state of the metal in the active material and a valence state readily available for the metal. (The term oxidation state and valence state are used in the art interchangeably.) For example, for an active material comprising iron (Fe) in the +2 oxidation state, $\Delta V^M=1$, wherein iron may be oxidized to the +3 oxidation state (although iron may also be oxidized to a +4 oxidation state in some circumstances). If b=1 (one atomic unit of Fe per atomic unit of material), the maximum amount (a') of alkali metal (oxidation state +1) that can be removed during cycling of the battery is 1 (one atomic unit of alkali metal). If b=0.5, the maximum amount of (a') of alkali metal that can be removed during cycling of the battery is 0.5.

M may comprise a single metal, or a combination of two or more metals. In embodiments where M is a combination of elements, the value of "b" and the total valence of M in the active material must be such that the resulting active material is electrically neutral (i.e., the positive charges of all anionic species in the material balance the negative charges of all cationic species), as further discussed below. The net valence of M ($V^M$) having a mixture of elements ($M^1, M^2 \ldots M^t$) may be represented by the formula $$V^M = V^{M1}b_1 + V^{M2}b_2 + \ldots V^{Mt} + b_t,$$

where $b_1+b_2+\ldots b_t=1$, and $V^{M1}$ is the oxidation state of M1, $V^{M2}$ is the oxidation state of $M^2$, etc. (The net valence of M and other components of the electrode active material is discussed further, below.)

M may be, in general, a metal or metalloid, selected from the group consisting of elements from Groups 2–14 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In a preferred embodiment, M comprises one or more transition metals from Groups 4 to 11. In one preferred embodiment, M is a +2 oxidation state transition metal. In another preferred embodiment, M is a +3 oxidation state transition metal. In another preferred embodiment, M comprises a mixture of metals, $M'_cM''_d$, where M' is at least one transition metal from Groups 4 to 11, M" is at least one element which is from Groups 2, 3, 12, 13, or 14; and c+d=b, wherein c>0 and d>0. In a preferred embodiment $0<(c+d)\leq 2$, more preferably $0.8\leq(c+d)\leq 1.5$, and even more preferably $1\leq(c+d)\leq 1.5$. Preferably $0<d<1$, preferably $0.01\leq d\leq 0.5$, more preferably $0.05\leq d\leq 0.2$, and even more preferably $0.05\leq d\leq 0.1$.

In another preferred embodiment, M comprises a mixture of metals, $M^1_eM^2_fM^3_g$, wherein $M^1$ is at least one transition metal from Groups 4 to 11, $M^2$ is at least one non-transition metal having a +2 oxidation state selected from Groups 2, and $M^3$ is a non transition metal having a +3 oxidation state selected from Group 13, and wherein e+f+g=b. In a preferred embodiment $0<(e+f+g)\leq 2$, more preferably $0.8\leq(e+f+g)\leq 1.5$, and even more preferably $1\leq(e+f+g)\leq 1.5$, wherein $0<(f+g)<1$, preferably $0.01\leq(f+g)\leq 0.5$, more preferably $0.05\leq(f+g)\leq 0.2$, and even more preferably $0.05\leq(f+g)\leq 0.1$.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals useful here include Fe, Co, Mn, V, Cr, Ti and mixtures thereof. In some embodiments, mixtures of transition metals are preferred. Although, a variety of oxidation states for such transition metals are available, in some embodiments it is most preferable that the transition metals have a +2 oxidation state.

M may also comprise non-transition metals and metalloids. Among such elements are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

The active materials comprise an $XO_4$ moeity of the formula $P_{1-x}Si_xO_4$, wherein $0 \leq x \leq 1$. In one preferred embodiment x=0, such that $XO_4$ is $PO_4$. In another preferred embodiment $0 \leq x \leq 0.8$, more preferably $0 \leq x \leq 0.5$.

The composition of M, X, and the values of a, b, c, d, and x, are selected so as to maintain electroneutrality of the electrode active material. As referred to herein "electroneutrality" is the state of the electrode active material wherein the sum of the positively charged species (e.g., A and M) in the material is equal to the sum of the negatively charged species (e.g. $XO_4$) in the material. Preferably, the $XO_4$ moieties are comprised to be, as a unit moiety, an anion having a charge ranging from −3 up to −4, depending on the selection of X.

In general, the valence state of each component element of the electrode active material may be determined in reference to the composition and valence state of the other component elements of the material. By reference to the general formula $A_aM_bXO_4$ the electroneutrality of the material may be determined using the formula $$(V^A)a + (V^M)b + (V^X)c = -(V^O)4$$

where $V^A$ is the net valence of A, $V^M$ is the net valence of M, $V^O$ is the net valence of O (oxygen) which is −2. Therefore:

$$(V^A)a + (V^M)b + (V^X)c = 8$$

As referred to herein, the "net valence" of a component is (a) the valence state for a component having a single element which occurs in the active material in a single valence state; or (b) the mole-weighted sum of the valence states of all elements in a component comprising more than one element, or comprising a single element having more than one valence state. The net valence of each component is represented in the following formulae:

$$(V^A)a = [(V^{A1})a^1 + (V^{A2})a^2 + \ldots (V^{An})a^n]/n; \ a^1 + a^2 + \ldots a^n = a$$

$$(V^M)b = [(V^{M1})b^1 + (V^{M2})b^2 + \ldots (V^{Mn})b^n]/n; \ b^1 + b^2 + \ldots b^n = b$$

In general, the quantity and composition of M is selected given the value of "x" (i.e., the valency of $XO_4$), the value of "c," and the amount of A, so long as M comprises at least one metal that is capable of oxidation. The calculation for the valence of M can be simplified, where $V^A=1$ as follows.

$$(V^M)b=(V^A)4+d-a-(V^X)$$

The values of a, b, and x, may result in stoichiometric or non-stoichiometric formulas for the electrode active materials. In a preferred embodiment, the values of a, b, and x, are all integer values, resulting in a stoichiometric formula. In another preferred embodiment, one or more of a, b, and x, may have non-integer values. It is understood, however, in embodiments having a lattice structure comprising multiple units of a non-stoichiometric formula $AaMbXO_4$, that the formula may be stoichiometric when looking at a multiple of the unit. That is, for a unit formula where one or more of a, b, and x, is a non-integer, the values of each variable become an integer value with respect to a number of units that is the least common multiplier of each of a, b, and x. For example, the active material $Li_{0.95}Co_{0.9}Al_{0.05}Mg_{0.05}PO_4$ is non-stoichiometric. However, in a material comprising twenty of such units in a lattice structure, the formula is $Li_{19}CO_{18}AlMg(PO_4)_{20}$.

A preferred electrode active material embodiment comprises a compound
of the formula $$Li_aM'_cM''_dPO_4,$$

wherein
(a) $0<a<1.0$;
(b) M' comprises at least one transition metal from Groups 4 to 11 of the Periodic table, where $c>0$;
(c) M" comprises one or more non-transition metals from Groups 2, 3, 12, 13, or 14 of the Periodic Table, $d>0$; and
wherein M', M", a, c, and d are selected so as to maintain electroneutrality of said compound.

Preferably, M' is selected from the group consisting of +2 and +3 oxidation state transition metal, preferably selected from the group consisting of Fe, Co, Ni, Mn, Cu, V, Zr, Ti, Cr, and mixtures thereof. In one preferred embodiment M' is selected from the group consisting of +2 oxidation state transition metals including Ti, V, Cr, Mn, Fe, Co, Ni, Cu and mixtures thereof. In another preferred embodiment, M' is selected from the group consisting of +3 oxidation state transition metal including Ti, V, Cr, Mn, and mixtures thereof. Preferably, M" is selected from the group consisting of +2 and +3 oxidation state non-transition metals including Mg, Ca, Zn, Sr, Pb, Cd, Sn, Ba, Be, Al, and mixtures thereof; more preferably M" is selected from the group consisting of Mg, Ca, Zn, Ba, Al, and mixtures thereof. In another embodiment, M" is selected from the group consisting of +3 oxidation state transition metals including Ti, V, Cr, and Mn.

Another preferred embodiment comprises a compound of the formula $$A_aM^1_eM^2_fM^3_gPO_4$$

wherein
(a) A is selected from the group consisting of Li, Na, K, and mixtures thereof, where $0<a<1$;
(b) $M^1$ comprises one or more transition metals, where $0<e$;
(c) $M^2$ comprises one or more +2 oxidation state non-transition metals;
(d) $M^3$ comprises one or more +3 oxidation state non-transition metals; and wherein $M^1$, $M^2$, $M^3$, X, a, e, f, and g are selected so as to maintain electroneutrality of said compound.

Where $M^1$ is a +2 oxidation state transition metal, $a+2e+2f+3g=3$. Preferably, $0<(e+f+g)\leq 2$, more preferably $0.8\leq(e+f+g)\leq 1.5$, and even more preferably $1\leq(e+f+g)\leq 1.5$, wherein $0<(f+g)<1$, preferably $0.01\leq(f+g)\leq 0.5$, more preferably $0.05\leq(f+g)\leq 0.2$, and even more preferably $0.05\leq(f+g)\leq 0.1$.

Preferably, $M^1$ is at least one transition metal from Groups 4 to 11 of the Periodic Table; $M^2$ is at least one element from Groups 2, 12, or 14 of the Periodic Table, and $M^3$ is selected from the group consisting of +3 oxidation state transition metals selected from Groups 4 to 11, +3 oxidation state non-transition metals selected from Groups 3 or 13, or mixtures thereof. Preferably $M^1$ is selected from the group consisting of Fe, Co, Ni, Mn, Cu, V, Zr, Ti, Cr, and mixtures thereof; more preferably $M^1$ is a +2 oxidation state transition metal selected from the group consisting of Fe, Co, Mn, Cu, V, Cr, and mixtures thereof. Preferably $M^2$ is selected from the group consisting +2 oxidation state non-transition metals and mixtures thereof; more preferably $M^2$ is selected from the group consisting of Be, Mg, Ca, Sr, Ba, Ra, Zn, Cd, Hg and mixtures thereof. Preferably, in one embodiment, $M^3$ is a +3 oxidation state transition metal, preferably $M^3$ is selected from Groups 4 to 11, more preferably Ti, V, Cr, Mn, Fe, and mixtures thereof. In another embodiment, $M^3$ is a +3 oxidation state non-transition metal, preferably $M^3$ is selected from Groups 3 or 13, more preferably Sc, Y, La, Ac, B, Al, Ga, In, Tl and mixtures thereof.

Another preferred embodiment comprises a compound of the formula $$A_aM'_{1+(x/2)}M''_{(1-a)/2}P_{1-x}Si_xO_4$$

wherein
(a) A is selected from the group consisting of Li, Na, K, and mixtures thereof, and $0<a<1$;
(b) M' comprises one or more +2 oxidation state transition metals; and
(c) M" comprises one or more +2 oxidation state non-transition metals,
wherein $x=0$, and M', M", a, and x are selected so as to maintain electroneutrality of said compound.

Preferably A is Li, or mixtures of Li with Na, K, or mixtures of Na and K. Preferably, M' is selected from the group consisting of Ti, V, Cr, Mn, Fe, Co, Ni, and mixtures thereof. Preferably, M" is a +2 oxidation state non-transition metal selected from the group consisting of Mg, Ca, Zn, Sr, Pb, Cd, Sn, Ba, Be, and mixtures thereof; more preferably, M" is selected from the group consisting of Mg, Ca, Zn, Ba, and mixtures thereof.

Another preferred embodiment comprises a compound of the formula:

$$A_aM'_{1+(x/2)}M''_{(1-a)/3}P_{1-x}Si_xO_4$$

wherein
(a) A is selected from the group consisting of Li, Na, K, and mixtures thereof, and $0<a<1$;
(b) M' comprises one or more +2 oxidation state metals, comprising at least one metal which is capable of undergoing oxidation to a higher valence state; and
(c) M" comprises one or more +3 oxidation state metals, including transition and non transition metals;
wherein $x=0$, and M', M", a, and x are selected so as to maintain electroneutrality of said compound.

In a preferred embodiment, A comprises Li, or mixtures of Li with Na or K. In another preferred embodiment, A comprises Na, K, or mixtures thereof. Preferably, M' is at least one metal selected from the group consisting of Ti, V, Cr, Mn, Fe, Co, Ni, and mixtures thereof. In one embodiment, M' additionally comprises a +2 oxidation state non-transition metal selected from the group consisting of Mg, Ca, Zn, Sr, Pb, Cd, Sn, Ba, Be, and mixtures thereof; preferably, M' includes one element selected from the group consisting of Mg, Ca, Zn, Ba, and mixtures thereof. In a preferred embodiment, M" comprises one or more +3 oxidation state non transition metals from Groups 3 and 13, preferably selected from the group consisting of Sc, Y, La, B, Al, Ga, In, Tl, and mixtures thereof. In another preferred embodiment, M" comprises a +3 oxidation state transition metal from Groups 4 to 11 of the Periodic Table, preferably selected from the group consisting of Cr, V, Ti, Mn, and mixtures thereof.

Among the preferred embodiments of this invention are the following electrode active materials: $Li_{0.5}V_{0.6}Mg_{0.65}PO_4$, $Li_{0.25}Fe_{0.7}Al_{0.45}PO_4$, $Li_{0.5}CoCr_{0.5}SiO_4$, $Li_{0.95}Co_{0.9}Al_{0.05}Mg_{0.05}PO_4$, $Li_{0.95}Fe_{0.8}Ca_{0.15}Al_{0.45}PO_4$, $Li_{0.75}CO_{0.6}Mg_{0.375}V_{0.1}PO_4$, $Li_{0.25}MnBe_{0.425}Ga_{0.3}SiO_4$, $Na_{0.75}Fe_{0.6}Mg_{0.375}Cr_{0.1}PO_4$, $Li_{0.5}Na_{0.25}Mn_{0.6}Ca_{0.375}Al_{0.1}PO_4$, $Li_{0.5}Mg_{0.25}FePO_4$, $Li_{0.75}Ca_{0.125}MnPO_4$, $Na_{0.6}Mg_{0.2}FePO_4$, $K_{0.25}Ca_{0.375}CoPO_4$, $Li_{0.4}Mn_{0.2}Ca_{0.5}Fe_{0.5}PO_4$, $Li_{0.25}Al_{0.25}Mg_{0.25}CO_{0.75}PO_4$, $Na_{0.55}B_{0.15}Ni_{0.75}Ba_{0.25}PO_4$, $Li_{0.8}Mg_{0.1}FePO_4$, $Li_{0.6}Mg_{0.2}FePO_4$, $Li_{0.7}Al_{0.1}FePO_4$, $Li_{0.8}Ca_{0.1}FePO_4$, $Li_{0.8}Zn_{0.1}FePO_4$, $Li_{0.8}Mg_{0.1}CoPO_4$, $Li_{0.8}Mg_{0.1}MnPO_4$, $Li_{0.8}Mg_{0.1}Mn_{0.5}Fe_{0.5}PO_4$, $Li_{0.6}Mg_{0.2}Mn_{0.5}Fe_{0.5}PO_4$, $Li_{0.6}Ca_{0.2}Mn_{0.2}Fe_{0.8}PO_4$, $Li_{0.8}Zn_{0.2}Mn_{0.2}Fe_{0.8}PO_4$, $Li_{0.6}Ca_{0.2}C_{0.2}Fe_{0.8}PO_4$, $Li_{0.8}Mg_{0.1}NiPO_4$, $Li_{0.8}Mg_{0.1}CuPO_4$, $Li_{0.7}Al_{0.1}Mn_{0.5}Fe_{0.5}PO_4$, $Li_{0.4}Al_{0.2}Mn_{0.5}Fe_{0.5}PO_4$, $Li_{0.7}Al_{0.1}Co_{0.5}Fe_{0.5}PO_4$, $Li_{0.7}B_{0.1}Co_{0.5}Fe_{0.5}PO_4$, $Li_{0.7}Al_{0.1}Co_{0.5}Mn_{0.5}PO_4$, $Li_{0.7}Al_{0.1}Co_{0.5}Ni_{0.5}PO_4$, $Li_{1.25}Fe_{1.25}Mg_{0.125}P_{0.50}Si_{0.50}O_4$, and $Li_{1.25}Fe_{1.25}Al_{0.083}P_{0.50}Si_{0.50}O_4$ Methods of Manufacture:

Active materials of general formula $A_{a+x}M_bP_{1-x}Si_xO_4$ are readily synthesized by reacting starting materials in a solid state reaction, with or without simultaneous oxidation or reduction of the metal species involved. According to the desired values of a, and b in the product, starting materials are chosen that contain "a" moles of alkali metal A from all sources, "b" moles of metals M from all sources, and one mole of $P_{1-x}Si_xO_4$ ($XO_4$) from all sources, again taking into account all sources. As discussed below, a particular starting material may be the source of more than one of the components A, M, and $XO_4$,. Alternatively it is possible to run the reaction with an excess of one or more of the starting materials. In such a case, the stoichiometry of the product will be determined by the limiting reagent among the components A, M, $XO_4$. Because in such a case at least some of the starting materials will be present in the reaction product mixture, it is usually desirable to provide exact molar amounts of all the starting materials.

Sources of alkali metal include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M include salts or compounds of any of the transition metals, alkaline earth metals, or lanthanide metals, as well as of non-transition metals such as aluminum, gallium, indium, thallium, tin, lead, and bismuth. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The metal M in the starting material may have any oxidation state, depending the oxidation state required in the desired product and the oxidizing or reducing conditions contemplated, as discussed below. The metal sources are chosen so that at least one metal in the final reaction product is capable of being in an oxidation state higher than it is in the reaction product.

Sources of the desired starting material anions for the phosphates, are provided by a number of salts or compounds containing positively charged cations in addition to the source of phosphate (or other $XO_4$ species). Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate or other $XO_4$ species, starting materials are preferably provided in particulate or powder form. Hydrates of any of the above may be used, as can mixtures of the above.

A starting material may provide more than one of the components A, M, and $XO_4$, as is evident in the list above. In various embodiments of the invention, starting materials are provided that combine, for example, the metal and the phosphate, thus requiring only the alkali metal to be added. In one embodiment, a starting material is provided that contains alkali metal, metal, and phosphate. There is complete flexibility to select starting materials containing any of the components of alkali metal A, metal M, and phosphate (or other $XO_4$ moiety), depending on availability. Combinations of starting materials providing each of the components may also be used.

In general, any anion may be combined with the alkali metal cation to provide the alkali metal source starting material, or with the metal M cation to provide the metal M starting material. Likewise, any cation may be used as counterion to the phosphate or similar $XO_4$ component. It is preferred, however, to select starting materials with counterions that give rise to volatile by-products. Thus, it is desirable to choose ammonium salts, carbonates, oxides, hydroxides, and the like where possible. Starting materials with these counterions tend to form volatile by-products such as water, ammonia, and carbon dioxide, which can be readily removed from the reaction mixture. This concept is well illustrated in the Examples below.

The sources of components A, M, and phosphate (or other $XO_4$ moiety), may be reacted together in the solid state while heating for a time and temperature sufficient to make a reaction product. The starting materials are provided in powder or particulate form. The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms. Exemplary times and temperatures for the reaction are given in the Examples below.

Another means for carrying out the reaction at a lower temperature is hydrothermally. In a hydrothermal reaction, the starting materials are mixed with a small amount of a liquid such as water, and placed in a pressurized bomb. The reaction temperature is limited to that which can be achieved by heating the liquid water in a continued volume creating an increased pressure, and the particular reaction vessel used.

The reaction may be carried out without redox, or if desired under reducing or oxidizing conditions. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in situ by including in the reaction mixture a reductant that will participate in the reaction to reduce the metal M, but that will produce by-products that will not interfere with the active material when used later in an electrode or an electrochemical cell. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolize under the reaction conditions to produce a reducing form of carbon. A preferred source of reducing carbon is elemental carbon.

The stoichiometry of the reduction can be selected along with the relative stoichiometric amounts of the starting components A, M, and $PO_4$ (or other $XO_4$ moiety). It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

When using a reducing atmosphere, it is difficult to provide less than an excess of reducing gas such as hydrogen. Under such as a situation, it is preferred to control the stoichiometry of the reaction by the other limiting reagents, as illustrated in the table. Alternatively the reduction may be carried out in the presence of reducing carbon such as elemental carbon. Experimentally, it would be possible to use precise amounts of reductant carbon as illustrated in the table for the case of reductant hydrogen to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

The carbothermal reduction method of synthesis of mixed metal phosphates has been described in PCT Publication WO/01/53198, Barker et al., incorporated by reference herein. The carbothermal method may be used to react starting materials in the presence of reducing carbon to form a variety of products. The carbon functions to reduce a metal ion in the starting material metal M source. The reducing carbon, for example in the form of elemental carbon powder, is mixed with the other starting materials and heated. For best results, the temperature should be about 400° C. or greater, and up to about 950° C. Higher temperatures may be used, but are usually not required.

Generally, higher temperature (about 650° C. to about 1000° C.) reactions produce CO as a by-product whereas $CO_2$ production is favored at lower temperatures (generally up to about 650° C.). The higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). In principle, such would affect the planning of the reaction, as one would have to consider not only the stoichiometry of the reductant but also the temperature of the reaction. When an excess of carbon is used, however, such concerns do not arise. It is therefore preferred to use an excess of carbon, and control the stoichiometry of the reaction with another of the starting materials as limiting reagent.

As noted above, the active materials $A_aM_bXO_4$ of the invention can contain a mixture of alkali metals A, a mixture of metals B, and a phosphate group representative of the $XO_4$ group in the formula. Thus, active materials are provided according to the invention wherein the $XO_4$ moiety is a phosphate group, wherein the phosphate (P) of the $XO_4$ moiety can be completely or partially substituted with silicon (Si).

To synthesize the active materials containing the modified phosphate moieties, it is usually possible to substitute all or part of the phosphate compounds discussed above with a source of the replacement anion. The replacement is considered on a stoichiometric basis and the starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or the mixed metal M may be a part of the modified phosphate compound.

When it is desired to partially or completely substitute phosphorous in the active materials for silicon, it is possible to use a wide variety of silicates and other silicon containing compounds. Thus, useful sources of silicon in the active materials of the invention include orthosilicates, pyrosilicates, cyclic silicate anions such as $(Si_3O_9)_6-$, $(Si_6O_{18})_{12}—$ and the like and pyrocenes represented by the formula $[(SiO_3)_2—]n$, for example $LiAl(SiO_3)_2$. Silica or $SiO_2$ may also be used. Partial substitution of silicate for phosphate is illustrated in the following examples.

To prepare the active materials containing the modified phosphate groups, it suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

In a preferred embodiment, a one step method is used to prepare the general formula $LiMPO_4$. The starting (precursor) materials for the first step include a lithium containing compound, a metal containing compound and a phosphate containing compound. Each of these compounds may be individually available or may be incorporated within the same compounds, such as a lithium metal compound or a metal phosphate compound.

In one method of this invention, the starting materials are intimately mixed and then reacted together when initiated by heat. In general, the mixed powders are pressed into a pellet. The pellet is then heated to an elevated temperature. This reaction can be run under an air atmosphere or a non-oxidizing atmosphere. In another method, the lithium metal phosphate compound can be formed either by a carbothermal reaction, or by a hydrogen reduction reaction.

The general aspects of the above synthesis route are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

The method includes reacting a lithium containing compound (lithium carbonate, $Li_2CO_3$), a metal containing compound having a phosphate group (for example, nickel phosphate, $Ni_3(PO_4)_{2-x}H_2O$, which usually has more than one mole of water), and a phosphoric acid derivative (such as a diammonium hydrogen phosphate, DAHP). The powders are pre-mixed with a mortar and pestle until uniformly dispersed, although various methods of mixing may be used. The mixed powders of the starting materials are pressed into pellets. The first stage reaction is conducted by heating the pellets in an oven at a preferred heating rate to an elevated temperature, and held at such elevated temperature for several hours. A preferred ramp rate of about 2° C./minute is used to heat to a preferable temperature of about 800° C.

Although in many instances a heating rate is desirable for a reaction, it is not always necessary for the success of the reaction. The reaction is carried out under a flowing air atmosphere (e.g., when M is Ni or Co), although the reaction could be carried out in an inert atmosphere such as $N_2$ or Ar (when M is Fe). The flow rate will depend on the size of the oven and the quantity needed to maintain the atmosphere. The reaction mixture is held at the elevated temperature for a time sufficient for the reaction product to be formed. The pellets are then allowed to cool to ambient temperature. The rate at which a sample is cooled may vary.

Electrodes:

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Batteries:

The batteries of the present invention comprise:
(a) a first electrode comprising an active material of the present invention;
(b) a second electrode which is a counter-electrode to said first electrode; and
(c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:

(a) from about 0% to about 95%, preferably from about 25% to about 95%, more preferably from about 50% to about 90%, of an insertion material;
(b) from about 2% to about 95% electrically conductive material (e.g., carbon black); and
(c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:
(a) from about 25% to about 95%, more preferably from about 50% to about 90%, active material;
(b) from about 2% to about 95% electrically conductive material (e.g., carbon black); and
(c) from about 3% to about 20% binder chosen to hold all particulate materials in contact with one another without degrading ionic conductivity.

Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_{1-m}Ni_mO_2$, where $0<m<1$. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

The batteries of this invention also comprise a suitable electrolyte that provides for transfer of ions between the cathode and anode. The electrolyte is preferably a material that exhibits high ionic conductivity, as well as having insular properties to prevent self-discharging during storage. The electrolyte can be either a liquid or a solid. Solid electrolytes preferably comprise a polymeric matrix which contains an ionic conductive medium. A liquid electrolyte preferably comprises a solvent and an alkali metal salt that form an ionically conducting liquid.

One preferred embodiment is a solid polymeric electrolyte, comprising a solid polymeric matrix of an electrolyte compatible material formed by polymerizing an organic or inorganic monomer (or partial polymer thereof) and which, when used in combination with the other components of the electrolyte, results in a solid state electrolyte. Suitable solid polymeric matrices include those well known in the art and include solid matrices formed from organic polymers, inorganic polymers or a solid matrix forming monomer and from partial polymers of a solid matrix forming monomer.

The polymeric electrolyte matrix comprises a salt, typically inorganic, which is homogeneously dispersed via a solvent vehicle throughout the matrix. The solvent is preferably a low molecular weight organic solvent added to the electrolyte, which may serve the purpose of solvating the inorganic ion salt. The solvent is preferably any compatible, relatively non-volatile, aprotic, relatively polar solvent, including dimethyl carbonate (DMC), diethyl carbonate (DEC), dipropylcarbonate (DPC), ethyl methyl carbonate (EMC), butylene carbonate, gamma-butyrolactone, triglyme, tetraglyme, lactones, esters, dimethylsulfoxide, dioxolane, sulfolane, and mixtures thereof. Preferred solvents include EC/DMC, EC/DEC, EC/DPC and EC/EMC. Preferably, the inorganic ion salt is a lithium or sodium salt, such as for example, $LiAsF_6$, $LiPF_6$, $LiClO_4$, $LiB(C_6H_5)_4$, $LiAlCl_4$, $LiBr$, and mixtures thereof, with the less toxic salts being preferable. The salt content is preferably from about 5% to about 65%, preferably from about 8% to about 35%. A preferred embodiment is a mixture of $EC:DMC:LiPF_6$ in a weight ratio of about 60:30:10. Electrolyte compositions among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Additionally, the electrolyte comprises a separator, or is surrounded by a separator membrane. The separator allows the migration of ions through the membrane while still providing a physical separation of the electric charge between the electrodes, to prevent short-circuiting. Preferably, the separator also inhibits elevated temperatures within the battery that can occur due to uncontrolled reactions, preferably by degrading upon high temperatures to provide infinite resistance to prevent further uncontrolled reactions. In a preferred embodiment, the polymeric matrix of the electrolyte can contain an additional polymer (a separator) or the original polymeric matrix itself may function as a separator, providing the physical isolation needed between the anode and cathode.

A preferred electrolyte separator film comprises approximately two parts polymer for every one part of a preferred fumed silica. The conductive solvent comprises any number of suitable solvents and salts. Desirable solvents and salts are described in U.S. Pat. No. 5,643,695, Barker et al., issued Jul. 1, 1997; and U.S. Pat. No. 5,418,091, Gozdz et al., issued May 23, 1995; both of which are incorporated by reference herein. One example is a mixture of EC:DMC:LiPF$_6$ in a weight ratio of about 60:30:10.

A separator membrane element is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab, for a description of tabs and collectors. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, a electrode membrane comprising the electrode active material (e.g., an insertion material such as carbon or graphite or a insertion compound) dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001. A preferred electrolyte matrix comprises organic polymers, including VdF:HFP. Examples of casting, lamination and formation of cells using VdF:HFP are as described in U.S. Pat. No. 5,418,091, Gozdz et al., issued May 23, 1995; U.S. Pat. No. 5,460,904, Gozdz et al., issued Oct. 24, 1995; U.S. Pat. No. 5,456,000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

The following non-limiting examples illustrate the active materials, compositions and methods of the present invention.

EXAMPLE 1

An electrode active material comprising $Li_{0.5}Ni_{1.25}PO_4$, representative of the formula $Li_aNi_bPO_4$, is made according to the following reaction scheme.

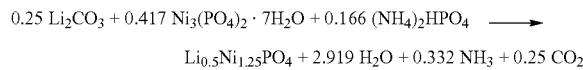

$$Li_{0.5}Ni_{1.25}PO_4 + 2.919\ H_2O + 0.332\ NH_3 + 0.25\ CO_2$$

A mixture of 18.475 g (0.25 mol) of $Li_2CO_3$, 204.77 g (0.417 mol) of $Ni_3(PO_4)_2 \cdot 7H_2O$, and 21.92 g (0.166 mol) of $(NH_4)_2HPO_4$ is made, using a mortar and pestle. The mixture is pelletized, and transferred to a box oven equipped with an atmospheric air gas flow. The mixture is heated, at a ramp rate of about 2° C. minute to an ultimate temperature of about 800° C., and maintained at this temperature for 16 hours. The product is then cooled to ambient temperature (about 21° C.).

A cathode electrode is made comprising the $Li_{0.5}Ni_{1.25}PO_4$ electrode active material, comprising 80% of the electrode active material; 8% Super P carbon; and 12% KYNAR® binder. (KYNAR® is a commercially available PVdF:HFP copolymer used as binder material.) A battery is made comprising the cathode, a lithium metal anode, and an electrolyte comprising a 1 molar $LiPF_6$ dissolved in a 2:1 weight ratio mixture of EC and DMC.

EXAMPLE 2

An electrode active material comprising $Li_{0.75}CO_{1.125}PO_4$ is made according to the following reaction scheme.

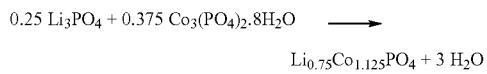

$$Li_{0.75}Co_{1.125}PO_4 + 3\ H_2O$$

A mixture of 28.39 g (0.25 mol) of $Li_3PO_4$ and 191.194 g (0.375 mol) of $CO_3(PO_4)_2 \cdot 8H_2O$ is made, using a mortar and pestle. The mixture is pelletized, and transferred to a box oven equipped with a atmosphere air gas flow. The mixture is heated at a ramp rate of about 2°/minute to an ultimate temperature of about 800° C., and maintained at this temperature for about 8 hours. The product is then cooled to about 25° C.

EXAMPLE 3

An electrode active material comprising $Li_{0.8}Mg_{0.1}FePO_4$, made according to the following reaction scheme.

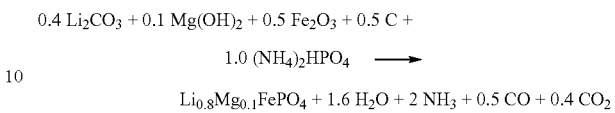

$$Li_{0.8}Mg_{0.1}FePO_4 + 1.6\ H_2O + 2\ NH_3 + 0.5\ CO + 0.4\ CO_2$$

A mixture of 29.56 g (0.4 mol) of $Li_2CO_3$, 5.83 g (0.1 mol) of $Mg(OH)_2$, 79.85 g (0.5 mol) of $Fe_2O_3$, 6.00 g (0.5 mol) of carbon (although may use up to 100% excess) and 132.06 g (1.0 mol) of $(NH_4)_2HPO_4$ is made, using a mortar and pestle. The mixture is pelletized, and transferred to a box oven equipped with an inert atmospheric condition. The mixture is heated, at a ramp rate of about 2° C. minute to an ultimate temperature of about 650–850° C., over a 48 hour period. The product is then cooled to ambient temperature (about 21° C.). It is possible that the material can be re-fired if necessary.

EXAMPLE 4

An electrode active material comprising $Li_{0.7}Al_{0.1}FePO_4$, made according to the following reaction scheme.

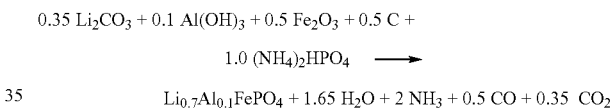

$$Li_{0.7}Al_{0.1}FePO_4 + 1.65\ H_2O + 2\ NH_3 + 0.5\ CO + 0.35\ CO_2$$

A mixture of 25.86 g (0.35 mol) of $Li_2CO_3$, 7.80 g (0.1 mol) of $Al(OH)_3$, 79.85 g (0.5 mol) $Fe_2O_3$, 6.00 g (0.5 mol) of carbon (although may use up to 100% excess) and 132.06 g (1.0 mol) of $(NH_4)_2HPO_4$ is made, using a mortar and pestle. The mixture is pelletized, and transferred to a box oven equipped with an inert atmospheric condition. The mixture is heated, at a ramp rate of about 2° C. minute to an ultimate temperature of about 650–850° C., over a 48 hour period. The product is then cooled to ambient temperature (about 21° C.). It is possible that the material can be re-fired if necessary.

EXAMPLE 5

An electrode active material comprising $Li_{0.8}Mg_{0.1}Mn_{0.5}Fe_{0.5}PO_4$, made according to the following reaction scheme.

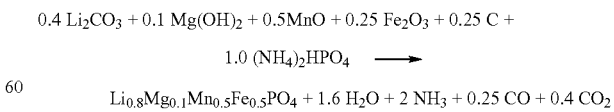

$$Li_{0.8}Mg_{0.1}Mn_{0.5}Fe_{0.5}PO_4 + 1.6\ H_2O + 2\ NH_3 + 0.25\ CO + 0.4\ CO_2$$

A mixture of 29.60 g (0.4 mol) of $Li_2CO_3$, 5.83 g (0.1 mol) of $Mg(OH)_2$, 35.47 g (0.5 mol) of MnO, 39.93 g (0.25 mol) $Fe_2O_3$, 3.00 g (0.25 mol) of carbon (although may use up to 100% excess) and 132.06 g (1.0 mol) of $(NH_4)_2HPO_4$ is made, using a mortar and pestle. The mixture is pelletized, and transferred to a box oven equipped with an inert atmospheric condition. The mixture is heated, at a ramp rate of about 2° C. minute to an ultimate temperature of about 650–850° C., over a 48 hour period. The product is then cooled to ambient temperature (about 21° C.). It is possible that the material can be re-fired if necessary.

EXAMPLE 6

An electrode active material comprising $Li_{0.5}Mg_{0.65}Co_{0.6}PO_4$, made according to the following reaction scheme.

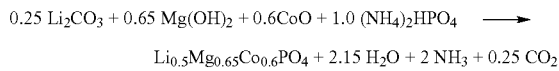

$Li_{0.5}Mg_{0.65}Co_{0.6}PO_4 + 2.15\ H_2O + 2\ NH_3 + 0.25\ CO_2$

A mixture of 18.47 g (0.25 mol) of $Li_2CO_3$, 37.91 g (0.65 mol) of $Mg(OH)_2$, 44.96 g (0.6 mol) of CoO, and 132.06 g (1.0 mol) of $(NH_4)_2HPO_4$ is made, using a mortar and pestle. The mixture is pelletized, and transferred to a box oven equipped with an inert atmospheric condition. The mixture is heated, at a ramp rate of about 2° C. minute to an ultimate temperature of about 650–850° C., over a 48 hour period. The product is then cooled to ambient temperature (about 21° C.). It is possible that the material can be re-fired if necessary.

What is claimed is:

1. A battery, comprising:
   a first electrode comprising an electrode active material represented by the formula

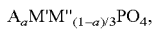

wherein:
   (i) A is selected from the group consisting of Li, Na, K, and mixtures thereof, where 0<a<1.0;
   (ii) M' comprises one or more +2 oxidation state metals, comprising at least one metal which is capable of undergoing oxidation to a higher valence state; and
   (iii) M" comprises one or more +3 oxidation state metals;
   the battery further comprising a second electrode; and
   an electrolyte for transferring ions between the first electrode and the second electrode.

2. The battery according to claim 1, wherein A is Li.

3. The battery according to claim 1, wherein A is a mixture of Li with Na or K.

4. The battery according to claim 1, wherein A is selected from the group consisting of Na, K, and a mixture thereof.

5. The battery according to claim 1, wherein M' is selected from the group consisting of Fe, Co, Ni, Ti, V, Cr, Mn, and mixtures thereof.

6. The battery according to claim 5, wherein M' is Fe.

7. The battery according to claim 5, wherein M' is Co.

8. The battery according to claim 5, wherein M' further comprises a +2 oxidation state non-transition metal selected from the group consisting of Mg, Ca, Zn, Sr, Pb, Cd, Sn, Ba, Be, and mixtures thereof.

9. The battery according to claim 5, wherein M' further comprises a +2 oxidation state non-transition metal selected from the group consisting of Mg, Ca, Zn, Ba, and mixtures thereof.

10. The battery according to claim 5, wherein M" comprises one or more +3 oxidation state non-transition metals selected from Groups 3 and 13 of the Periodic Table.

11. The battery according to claim 10, wherein M" is selected from the group consisting of B, Al, Ga, In, and mixtures thereof.

12. The battery according to claim 10, wherein M" is Al.

13. The battery according to claim 10, wherein A is Li.

14. The battery according to claim 5, wherein M" comprises a +3 oxidation state transition metal.

15. The battery according to claim 14, wherein M" is selected from the group consisting of Ti, V, Cr, Mn, and mixtures thereof.

16. The battery according to claim 14, wherein A is Li.

17. The battery according to claim 1, wherein M" comprises one or more +3 oxidation state non-transition metals selected from Groups 3 and 13 of the Periodic Table.

18. The battery according to claim 17, wherein M" is selected from the group consisting of B, Al, Ga, In, and mixtures thereof.

19. The battery according to claim 17, wherein M" is Al.

20. The battery according to claim 17, wherein A is Li.

21. The battery according to claim 1, wherein M" comprises a +3 oxidation state transition metal.

22. The battery according to claim 21, wherein M" is selected from the group consisting of Ti, V, Cr, Mn, and mixtures thereof.

23. The battery according to claim 21, wherein A is Li.

24. The battery according to claim 1, wherein the second electrode comprises an intercalation material selected from the group consisting of a metal oxide, metal chalcogenide, carbon, graphite, and mixtures thereof.

25. The battery according to claim 24, wherein the intercalation material is graphite.

26. The battery according to claim 24, wherein the electrolyte comprises a solvent selected from the group consisting of dimethyl carbonate (DMC), diethyl carbonate (DEC), dipropylcarbonate (DPC), ethyl methyl carbonate (EMC), butylene carbonate, gamma-butyrolactone, triglyme, tetraglyme, lactones, esters, dimethylsulfoxide, dioxolane, sulfolane, and mixtures thereof.

27. The battery according to claim 26, wherein the solvent further comprises a salt selected from the group consisting of $LiAsF_6$, $LiPF_6$, $LiClO_4$, $LiB(C_6H_5)_4$, $LiAlCl_4$, LiBr, and mixtures thereof.

* * * * *